March 19, 1963     J. B. MATHIS     3,081,695

BROILER CONTROL

Filed March 1, 1957     3 Sheets-Sheet 1

Inventor
John B. Mathis
Carlson, Pitzner, Hubbard & Wolfe
Attorneys

March 19, 1963 J. B. MATHIS 3,081,695
BROILER CONTROL
Filed March 1, 1957 3 Sheets-Sheet 2
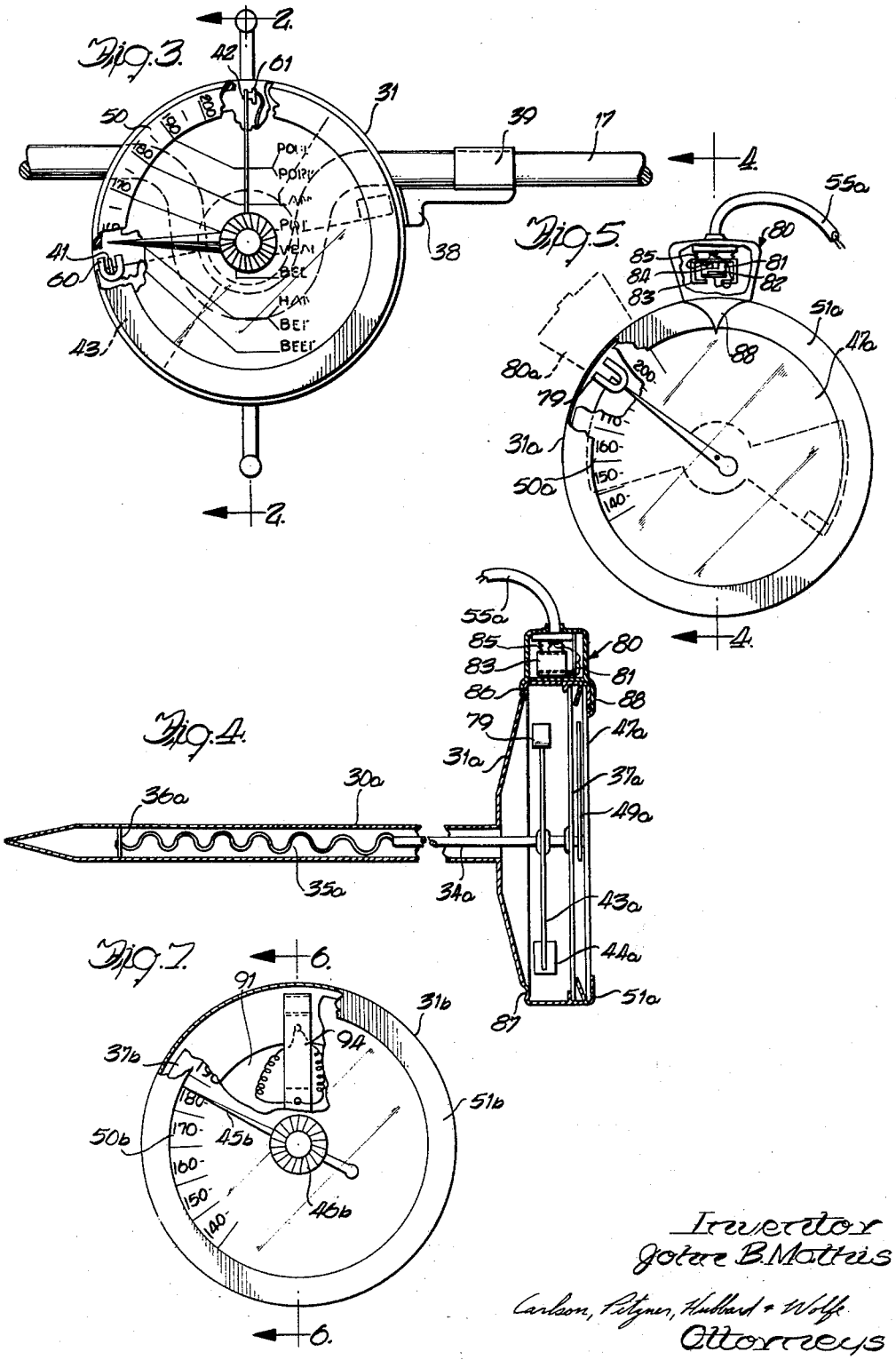
Inventor
John B. Mathis
Carlson, Pitzner, Hubbard & Wolf
Attorneys March 19, 1963  J. B. MATHIS  3,081,695
BROILER CONTROL
Filed March 1, 1957  3 Sheets-Sheet 3
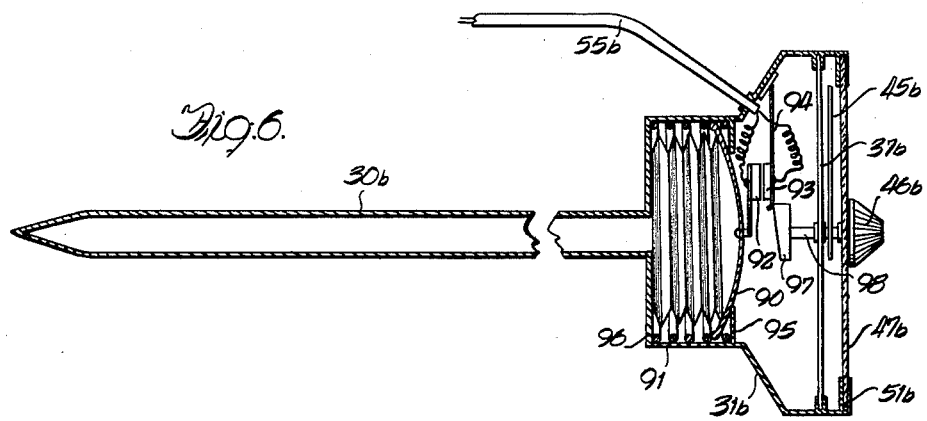
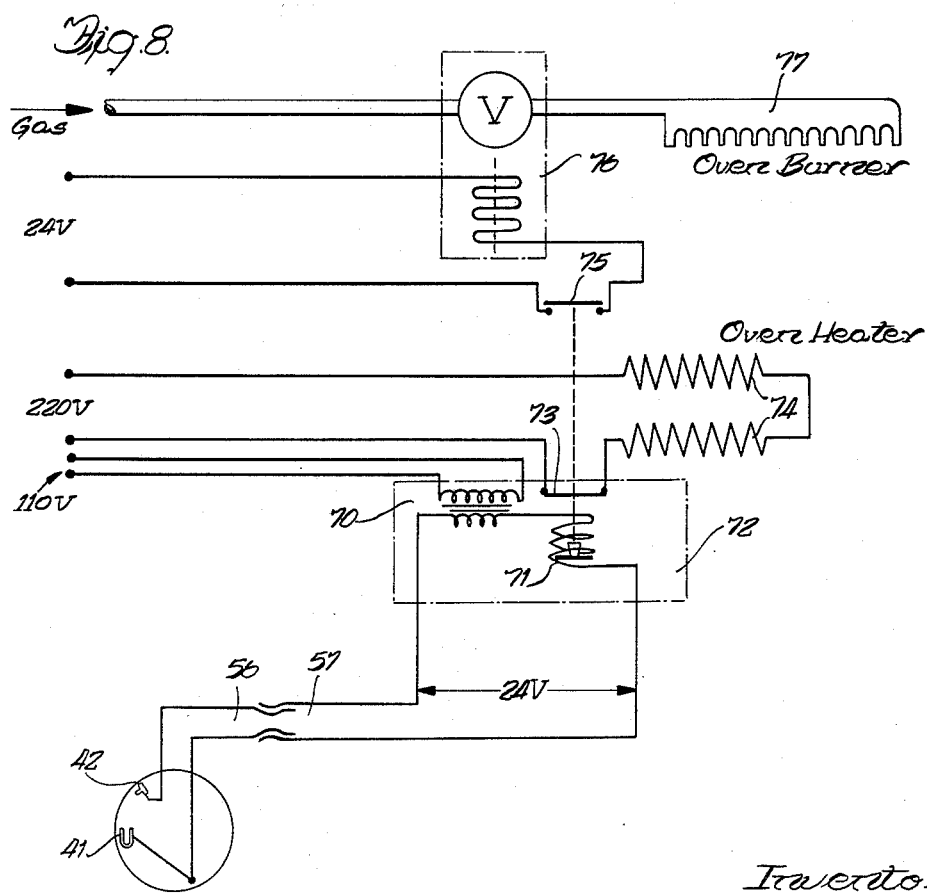
Inventor
John B. Mathis
Carlson, Pitzner, Hubbard & Wolf
Attorneys United States Patent Office 3,081,695
Patented Mar. 19, 1963

3,081,695
BROILER CONTROL
John B. Mathis, Chicago, Ill., assignor to Geo. D. Roper Corporation, a corporation of Massachusetts
Filed Mar. 1, 1957, Ser. No. 643,453
3 Claims. (Cl. 99—421)

This invention relates to foodstuff temperature sensing devices for use with cooking broilers, and more particularly to an instrumentality actuating control responsive to the internal temperature of a foodstuff in a cooking broiler.

The present application is a continuation-in-part of the copending application entitled Rotary Spit Thermometer, Serial No. 540,050, filed October 12, 1955, now Patent No. 2,787,948, issued April 9, 1957.

It is an object of the invention to provide a control system effective to actuate an instrumentality when the internal temperature of a foodstuff being cooked reaches a preselected temperature, this temperature being one of the best indications of the progress of the cooking operation.

It is a further object of the invention to dispose a temperature sensing element within a broiler rotary spit assembly and control the broiler heat source in response to the temperature at the center of a foodstuff carried on the spit.

It is a more specific object to provide an oven with a novel control system effective to turn the oven heating means off when a spit-carried foodstuff in the oven is cooked to a desired degree. It is a related object to control an oven by the interior temperature of the foodstuff, whether the latter is being cooked on a revolving rotisserie spit or is at rest.

It is a further and more detailed object to provide a control system of the type referred to above with a continuously reading temperature indicator so that the state of the cooking operation can be readily determined at any time.

In one of its aspects, it is an object of the invention to provide novel temperature responsive electrical switches actuated by heat-sensing means within a narrow tube or spit and affording reliable positive switching at accurately preselectable temperatures.

It is also an object to provide a control system of the above type that can be readily adjusted for operation at any temperature within the range attainable by the oven with which it is used.

It is moreover an object to provide a rotary spit thermometer oven control of this character that is simple, reliable and accurate.

Other objects and advantages of the invention will become apparent upon reading the attached detailed description and upon reference to the accompanying drawings, in which:

FIG. 3 is an end view of the assembly shown in FIG. 2;

FIG. 4 is a longitudinal sectional view, taken substantially along the line 4—4 in FIG. 5, of a modified form of sensing and control unit;

FIG. 5 is an end view of the unit shown in FIG. 4;

FIG. 6 is a longitudinal sectional view, taken substantially along the line 6—6 in FIG. 7, of a second modified form of control unit;

FIG. 7 is an end view of the unit shown in FIG. 6; and

FIG. 8 is a schematic wiring diagram showing a control circuit constructed according to the present invention.

While the invention will be described in conjunction with several preferred embodiments, it will be understood that I do not intend to limit the invention to those embodiments but, on the contrary, intend to cover such alternative embodiments and constructions as may be included within the spirit and scope of the invention as defined by the appended claims.

Figure 1:
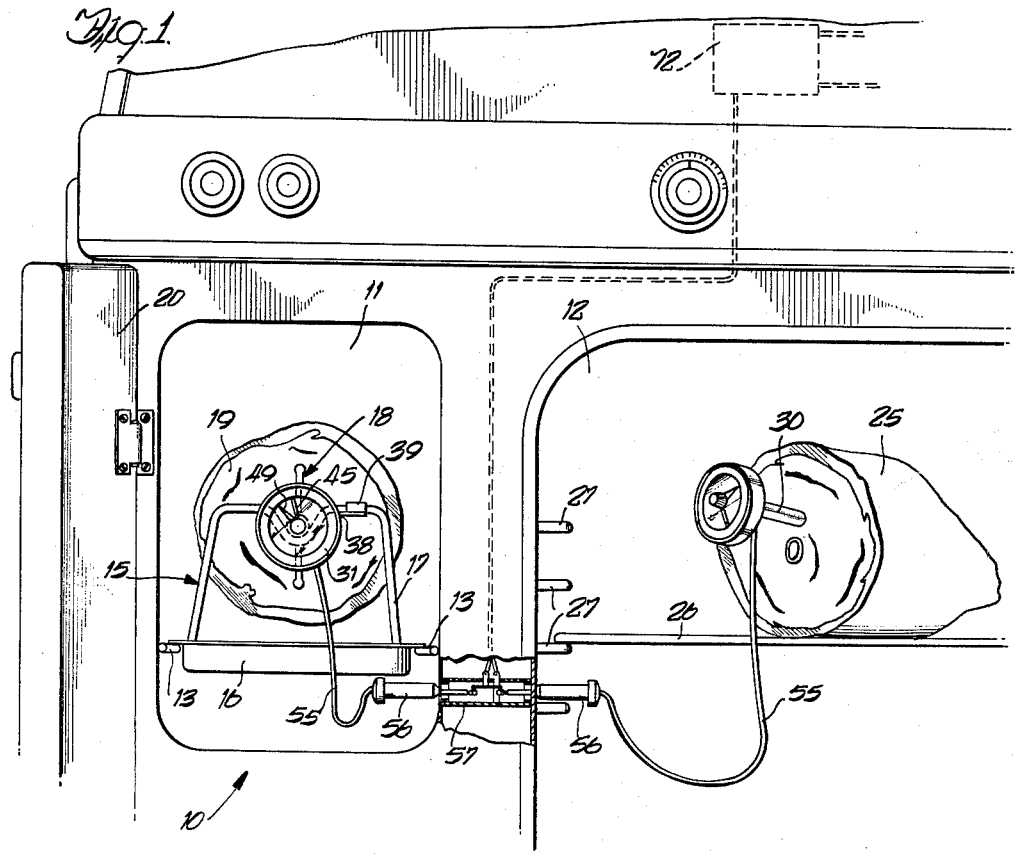
FIGURE 1 is a fragmentary front view of an oven in which has been installed a rotary spit thermometer and oven control embodying the features of the present invention.

Turning first to FIG. 1, there is shown a portion of a range 10 utilizing the oven control of the present invention. In the present instance, the range 10 comprises two oven chambers 11 and 12. Slidably supported in chamber 11 on brackets 13 is a rotatable spit or rotisserie assembly 15 which includes a drip pan 16, a spit support 17, and a spit shaft unit 18 (see also FIG. 2). When the drip pan 16 is slid into the oven chamber 11 the rotatable spit shaft unit 18 engages a power driven socket, not shown, at the rear of the oven chamber which is adapted to engage the shaft and rotate it at the slow speed required for rotating spit cooking. This general arrangement and construction is well known to those skilled in the art, and for details of a particular driving connection reference is made to the above-mentioned U.S. Patent No. 2,787,948.

In FIG. 1 the spit assembly 15 is shown supporting a foodstuff 19 in the proper cooking position, so that an oven door 20 can be closed and the cooking commenced. The spit shaft unit 18 supports the foodstuff 19 in the usual manner by means of a spit shaft 22 which pierces and supports the foodstuff clear of any obstructions and free to slowly revolve as the cooking proceeds.

In the oven chamber 12 a second foodstuff 25 is shown resting on a rack 26 which in turn is supported by a suitable pair of brackets 27, only one of each pair being shown, that are fixed to the side walls of the oven chamber. Later reference will be made to this oven chamber which does not include a rotatable spit.

In order to support the spit shaft unit 18 for free rotation within the oven chamber 11, the spit carries at one end a bearing member 21 which, in the present instance, is formed integrally with the spit shaft 22. The bearing member 21 is cradled and journaled within a curved portion of the suitably formed support 17. To prevent the foodstuff into which the spit shaft 22 has been inserted from interfering with the rotation of the spit unit, a blocking hilt or handle 23, which the foodstuff may abut, is located between the bearing member 21 and the remainder of the shaft 22. The spit shaft 22 of the unit 18 is hollow and, in the present instance, is a tubular member ending in a sharpened point, not shown, which expedites the insertion of the spit shaft into and through the foodstuff.

In accordance with the present invention, a temperature sensing tube 30 is adapted to be slid within the hollow spit shaft 22 and a control system for an instrumentality is provided which is responsive to the attainment of a preselected temperature by the tube. In this way the control system will respond and actuate the instrumentality when the interior of the foodstuff being cooked has reached a certain temperature, which is one of the best indications of the status of the cooking operation.

Figure 2:
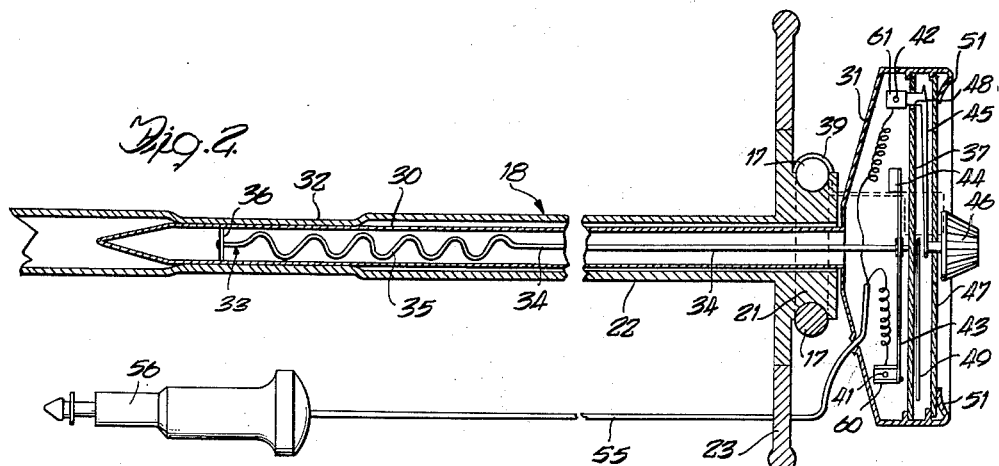
FIG. 2 is a longitudinal sectional view, taken substantially along the line 2—2 in FIG. 3, of the temperature sensing and control assembly shown in FIG. 1.

In the embodiment illustrated in FIGS. 2 and 3, the sensing tube 30 has fixed to one end a switch and dial housing 31. This housing provides a convenient handle when slipping the sensing tube 30 within the hollow shaft 22. To support the forward end of the sensing tube when inserted within the shaft 22, the shaft is formed with a series of radially spaced depressions 32 which have the effect of narrowing the internal diameter of the hollow shaft so as to snugly engage the sensing tube.

In order to prevent the housing 31 and its associated parts from being rotated as the spit shaft 22 turns, a bracket 38 is secured to the outer edge of the housing 31 and includes an arcuate finger 39 engaged with the spit support bar 17 so as to resist the rotational tendency imparted to the housing 31 by the rotating spit shaft.

To respond to the temperature of the tube 30 and thus the temperature at the center of the foodstuff skewered on the spit 22, a sensing element 33 is mounted within the tube. In this instance the sensing element 33 comprises a bi-metal strip 34 extending longitudinally of the tube 30 and which is formed near the forward end of the tube with a helically coiled portion 35. The strip 34 is held fast at its coiled end to the tube 30 by a suitable anchor 36 and is rotatably supported at its opposite end by a dial plate 37 fixed within the housing 31. It can be seen that temperature changes transmitted to the strip 34 will cause the coiled portion 35 to wind or unwind, thus rotating the opposite end of the strip 34 within the support provided by the dial plate 37.

In carrying out the invention, the rotation of strip 34 within the dial plate 37 is utilized to close a pair of contacts 41, 42 which in turn activate a control system for the oven. In the embodiment being described, the first contact 41 is carried by an arm 43 fixed to the strip 34 and balanced by a suitable counterweight 44. The second contact 42 is supported in the path of the rotational movement of contact 41 on a positionable arm 45.

To adjustably position the arm 45, and thus preselect the temperature at which it is desired to have the contacts 41, 42 engage and actuate the control system, an adjusting knob 46 is rotatably mounted in a transparent dial face 47. The outer end of the arm 45 is bent at a right angle to extend through a slot 48 formed in the dial plate 37 so as to hold the contact 42 in its proper position. In order to indicate the temperature of tube 30 and the proximity of the two contacts at any given time, a pointer 49 is attached to the strip 34 on the outer or visible side of the dial plate 37, the positions of the pointer 49 and the arm 43 on strip 34 are adjusted so that the pointer 49 and the indicator arm 45 accurately indicate the relative locations of the contacts 41, 42.

So that the positions of the indicator 45 and the pointer 49 can be translated into degrees of temperature, a scale 50 is provided (see FIG. 3) in cooperative relation with the pointer and the dial. In this instance the indicia of the scale 50 are inscribed on the turned rim portion 51 of the housing 31. This portion 51 also serves to hold the transparent dial face 47 in position.

To electrically connect the contacts 41, 42 to the rest of the control system a double lead wire 55 of any suitable length is provided. The wire 55 is preferably terminated by a plug jack 56 which may be easily connected with or disconnected from the control system of the oven by insertion or removal into a suitable jack socket 57 (see FIG. 1). This permits the user of the oven to quickly release the connection and remove the tube 30 so that the oven can be operated in the conventional manner. The socket 57 is a dual unit that opens into each of the oven chambers 11, 12 so that the temperature sensing tube 30 may be utilized both with the hollow spit in the chamber 11 and in the oven chamber 12 by inserting it directly into the foodstuff 25.

In accordance with a further aspect of the invention, the contacts 41, 42 are associated with a small magnet 60 and its armature 61, respectively, so that positive engagement of the contacts is assured when they are brought into close proximity. In the illustrated embodiment, the arm 43 carrying contact 41 also supports a small horseshoe magnet 60 (see FIG. 3) which is positioned to attract the armature 61 on the selector arm 45. It will thus be apparent that as the arm 43 revolves, due to the action of the heat on the coiled portion 35 of the bi-metal strip 34, so as to bring the contact 41 near its associated contact 42, the magnetic force exerted between the magnet 60 and the armature 61 will finally draw the contacts into firm mutual engagement by a snap-action, thus assuring a good electrical connection and positive operation of the control system.

Turning now to the exemplary control system which is schematically illustrated in FIG. 8, it can be seen that closing the contacts 41 and 42 completes an electrical circuit deriving power from a transformer 70 so as to energize the coil of a relay 71. The transformer 70 and the relay 71 are both enclosed within a transformer-relay box 72 which may be located at any convenient position on the stove, as, for example, behind the splash backpanel as illustrated in FIG. 1.

In accordance with a further aspect of the invention, the relay 71 is utilized to control the oven heating devices so that when a preselected temperature is attained by the interior of the foodstuff being cooked, which indicates that it is "done," the oven will be automatically turned off without further attention from the operator. To accomplish this objective in the case of an electric oven, the relay 71 has normally closed contacts 73 in series with electric oven heater units 74 connected to a conventional 220 volt power source. When the relay 71 is picked up the contacts 73 are opened to deenergize the oven heater units 74. The relay 71 is preferably a latching relay of the manually reset type so that it will not recycle to again close switch 73 when the relay is deenergized following the cooling of the foodstuff and the resulting separation of contacts 41, 42.

Alternatively, if the oven is of the gas burning type, the relay 71 may have normally open contacts 75 connected in series across a suitable voltage source with a normally open solenoid controlled valve 76 disposed in the feed conduit for a gas oven burner 77. When the contacts 41, 42 engage, the relay 71 will be energized and the contacts 75 closed, so that the solenoid valve 76 is actuated to shut off the supply of gas to the burner 77.

While there are many obvious advantages to an automatic shut off control for an oven which reacts when the cooking has been completed, the present invention is not to be construed as limited to this particular type of control system. The relay 71 could alternatively control the actuation of an audible alarm such as a buzzer or bell, or could be connected to cause a light to be turned on or off to indicate to the user of the oven that the cooking operation has been completed or has reached a certain stage in its progress.

A second form of the temperature sensing unit 30 and associated components is illustrated in FIGS. 4 and 5. In these figures elements identical to those described above are similarly numbered, but with the distinguishing suffix "a" added. In this embodiment the sensing tube 30a encloses a bi-metal strip 34a which has a coiled portion 35a, one end of which is secured to the tube 30a by anchor 36a. The bi-metal strip 34a is pivoted within the dial plate 37a and carries both a pointer 49a and an arm 43a in the manner described above. In this instance, however, the arm 43a carries only a magnet 79 balanced by a suitable counterweight 44a. A magnetically actuated switch 80 is removably snapped onto the rim of the dial housing 31a and is operated whenever the arm 43a moves the magnet 79 into close proximity.

While the magnetically operated switch 80 may be of any convenient type, the illustrated switch comprises an L-shaped bracket 81 which supports a fixed contact 82 and includes an open sided, box-like armature 83 which carries a movable contact 84. The armature 83 is urged by springs 85 outwardly from the housing 31a so as to separate the contacts 82, 84. However, when the magnet 79 is swung beneath the switch 80 the armature 83 is drawn downwardly, bringing the contacts 82, 84 into positive engagement. The switch contacts 82, 84 may be substituted for the contacts 41, 42 in the control circuit of FIG. 8, so that the same mode of operation previously described will be obtained.

As mentioned above, the switch 80 is removably snapped onto the rim of the housing 31a and is retained in position by the cooperation between a resilient finger 86 which seats within a groove 87 formed around the back of the dial housing 31a, and the tip of a pointer 88 which resiliently snaps over the turned edge portion 51a of the housing. By means of this construction this entire switch unit 80 can be easily removed from the housing 31a when the user of the oven does not desire to use the automatic control system. This removability feature also permits the easy adjustment of the switch 80 around the rim of the housing 31a so as to correspond to any temperature at which it is desired to actuate the control system. Note, for example, the dashed line position of the switch 80 designated 80a in FIG. 5.

To visually correlate the position of the dial pointer 49a with the temperature of the oven, a graduated scale 50a is inscribed on the dial plate 37a (see FIG. 4). This scale also permits the setting of the switch 80 so that the control system for the oven will be actuated upon the temperature sensing tube reaching a desired preselected temperature.

A third modification of the sensing tube and switch elements is illustrated in FIGS. 6 and 7 in which components similar to those first described are given similar numerals with the distinguishing suffic "b" added. In this embodiment the sensing tube 30b opens into a bellows 90 carried within a cylindrical portion 91 of the housing 31b. The tube 30b and the bellows 90 are filled with a liquid or gas having a high thermal coefficient of expansion and contacts are positioned to be brought into engagement as the liquid or gas is heated and expands the bellows 90. In the present instance one contact 92 is fixed to the center of the end wall of bellows 90 and a second contact 93 is mounted on a flexible strip 94 closely spaced from contact 92.

To keep the contacts normally out of engagement, the bellows is urged toward its collapsed position by a retaining ring 95 which is urged to the left in FIG. 6 by a tensioned coil spring 96. It can thus be seen that the coil spring 96 and retaining ring 95 cooperate to maintain the bellows 90 in a nearly collapsed position, but that when the gas or liquid medium within the sensing tube 30b and bellows 90 is heated, its resulting expansion will overcome the force of the spring 96 to expand the bellows 90 and bring the contacts 92, 93 into engagement. The contacts 92, 93 may be substituted for the contacts 41, 42 in the control circuit of FIG. 8, so that the control system operation will be substantially the same as previously described.

For the purpose of adjusting the temperature at which the contacts 92 and 93 will come into engagement, a face cam 97 is utilized to position the contact 93 under the control of the knob 46b. The cam 97 and knob 46b are both secured to the same stubshaft 98 so that by turning the knob 46b the cam 97 is rotated. Thus, the contact 93 is moved toward or away from the contact 92 as the resilient strip 94 rides on the inclined face of the cam 97. To provide a visual indication of the position of cam 97 and to relate that position to a particular temperature, an indicator 45b is also secured to the stubshaft 98 and a graduated scale 50b is inscribed on the dial plate 37b in cooperative relation to the indicator.

The contacts 92 and 93, or only one of them, are suitably magnetized so that they will snap into firm, electrically positive contact when brought into close proximity by the expansion of the bellows 90.

It will be appreciated that any of the three temperature sensing tubes 30, 30a and 30b described above can be easily and simply inserted within the hollow spit 22 for controlling the oven directly from the temperature of the foodstuff being revolved and cooked on the spit. Alternatively, as shown in the chamber 12 in FIG. 1, any of these sensing tubes can be inserted into the foodstuff 25 being cooked in a normal oven and resting on the conventional rack. In either case the control system is automatically activated when the foodstuff reaches a preselected internal temperature indicating that the cooking operation has been completed.

I claim as my invention:

1. In combination with a broiler having a removable support for a rotatable cooking spit, a temperature responsive control system comprising, a hollow spit for supporting a foodstuff, said spit being held by said support for rotation thereon, a temperature responsive element disposed within said hollow spit, means coupling said element and said support to prevent rotation of said element as said spit is rotated, an instrumentality to be actuated when the interior of the spit supported foodstuff reaches a preselected temperature, and means interconnecting said element and said instrumentality to actuate the latter in response to the former reaching a predetermined temperature, said last named means including a readily releasable connection permitting conventional operation of the broiler by simply releasing said connection and removing the element.

2. A temperature responsive control system for an oven having both a support and a driving connection for a rotatable cooking spit, comprising, in combination, a hollow spit adapted to be inserted through a foodstuff, said spit being rotatably held by said support in engagement with said driving connection, a hollow pointed shaft having a housing at one end, a temperature responsive element disposed within said shaft, an electrical contact movably mounted in said housing and coupled to said element so as to be variably positioned by the element according to the temperature of the latter, a second electrical contact adjustably positionable within said housing along the path of said first contact to a point corresponding to a desired preselected temperature, a control for shutting off the oven, and means associated with said contacts for actuating said control when the contacts move into mutual engagement.

3. A temperature responsive control system for an oven having both a support and a driving connection for a rotatable cooking spit, comprising, in combination, a hollow spit pointed at one end for insertion through a foodstuff and having a housing at its non-pointed end, said spit being rotatably held by said support in engagement with said driving connection so as to be rotated thereby, an element disposed within said hollow spit which physically deflects in response to temperature changes, an electrical contact movably mounted in said housing and being coupled to said element so as to be variably positioned by the element according to the temperature of the latter, a second electrical contact positionable within said housing along the path of movement of said first contact so as to be adjustable to a point corresponding to a desired preselected temperature, a control for shutting off the oven, and means associated with said first and second contacts for actuating said control when the contacts move into mutual engagement at said preselected temperature.

References Cited in the file of this patent

UNITED STATES PATENTS

| Re. 16,940 | Massa | Apr. 24, 1928 |
| 2,014,386 | Lamb | Sept. 17, 1935 |
| 2,510,526 | Smith | June 6, 1950 |
| 2,529,652 | Dicke | Nov. 14, 1950 |
| 2,635,137 | Basham | Apr. 14, 1953 |
| 2,657,580 | Schroeder | Nov. 3, 1953 |
| 2,733,387 | Englehard | Jan. 31, 1956 |
| 2,820,130 | Dadson | Jan. 14, 1958 |